(12) United States Patent
Konno et al.

(10) Patent No.: US 11,784,550 B2
(45) Date of Patent: Oct. 10, 2023

(54) PERMANENT FIELD MAGNET, MANUFACTURING METHOD, AND LINEAR MOTOR

(71) Applicant: FUJI ELECTRIC CO., LTD., Kanagawa (JP)

(72) Inventors: Yusuke Konno, Kanagawa (JP); Satoshi Imamori, Tokyo (JP)

(73) Assignee: FUJI ELECTRIC CO., LTD., Kawasaki (JP)

(*) Notice: Subject to any disclaimer, the term of this patent is extended or adjusted under 35 U.S.C. 154(b) by 36 days.

(21) Appl. No.: 17/354,047

(22) Filed: Jun. 22, 2021

(65) Prior Publication Data

US 2022/0060097 A1    Feb. 24, 2022

(30) Foreign Application Priority Data

Aug. 21, 2020   (JP) ................. 2020-140407

(51) Int. Cl.
   *H02K 41/03*   (2006.01)
(52) U.S. Cl.
   CPC .................. *H02K 41/033* (2013.01)
(58) Field of Classification Search
   CPC .... H02K 41/033; H02K 41/031; H02K 33/06; H02K 33/16; H02K 35/02
   USPC ............... 310/12.15, 12.18, 12.24
   See application file for complete search history.

(56) References Cited

U.S. PATENT DOCUMENTS

| | | | |
|---|---|---|---|
| 8,810,082 B2 | 8/2014 | Aoyama et al. | |
| 2002/0117903 A1* | 8/2002 | Uchida | H02K 41/03 310/12.24 |
| 2004/0090129 A1* | 5/2004 | Uchida | B82Y 10/00 310/12.19 |
| 2005/0046282 A1* | 3/2005 | Tang | H02K 41/031 310/12.02 |
| 2008/0218004 A1* | 9/2008 | Mukaide | H02K 41/03 310/12.25 |
| 2008/0258567 A1* | 10/2008 | Mukaide | H02K 41/03 310/12.25 |
| 2011/0278958 A1* | 11/2011 | Kawakami | H02K 41/02 310/12.25 |
| 2011/0298308 A1* | 12/2011 | Aoyama | H02K 41/03 310/12.18 |

FOREIGN PATENT DOCUMENTS

| | | |
|---|---|---|
| JP | 2011-067030 | 3/2011 |
| JP | 5313333 | 10/2013 |
| JP | 2018-064371 | 4/2018 |

* cited by examiner

*Primary Examiner* — Michael Andrews
(74) *Attorney, Agent, or Firm* — IPUSA, PLLC

(57) ABSTRACT

A permanent field magnet is disposed between two armatures parallel to each other, and includes a first field magnet section facing a first armature of the two armatures, and a second field magnet section facing a second armature of the two armatures that is different from the first armature. The first field magnet section includes a first main magnet that generates a magnetic field for the first armature and a first auxiliary magnet that increases magnetic flux of a magnetic pole of the first main magnet. The second field magnet section includes a second main magnet that generates a magnetic field for the second armature and a second auxiliary magnet that increases magnetic flux of a magnetic pole of the second main magnet. The first main magnet and the second main magnet, or the first auxiliary magnet and the second auxiliary magnet, are permanent magnets magnetized in the same direction.

11 Claims, 13 Drawing Sheets

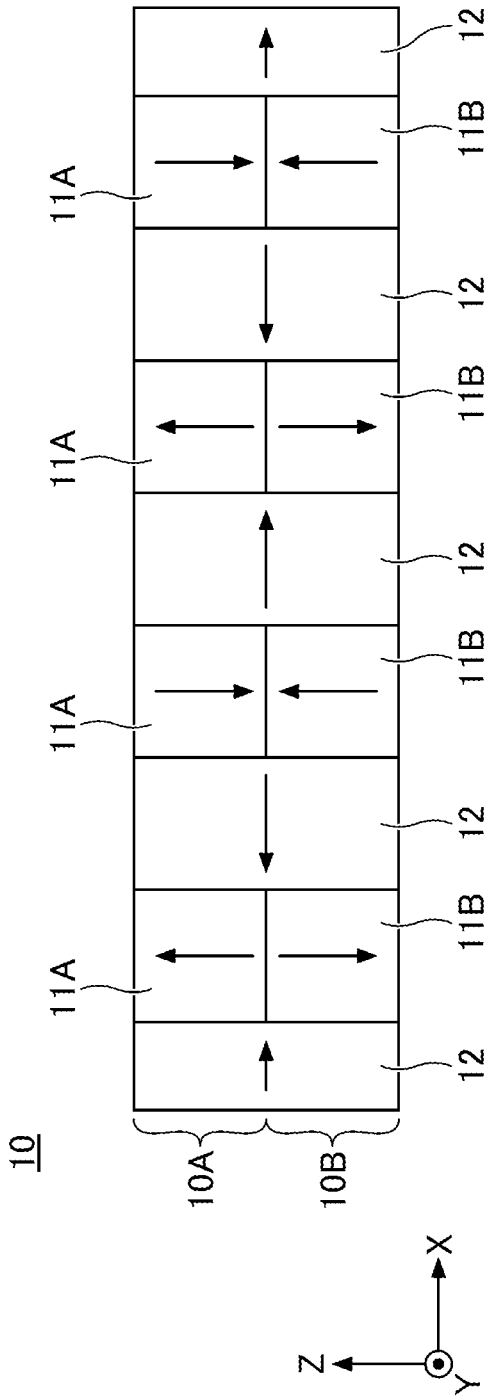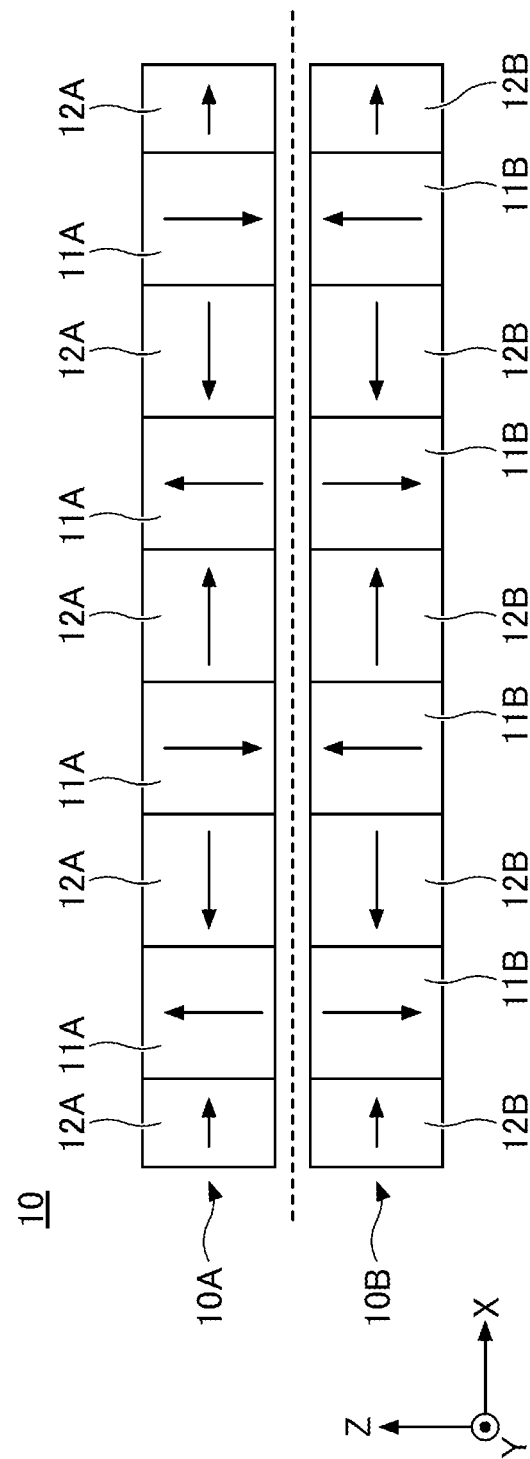

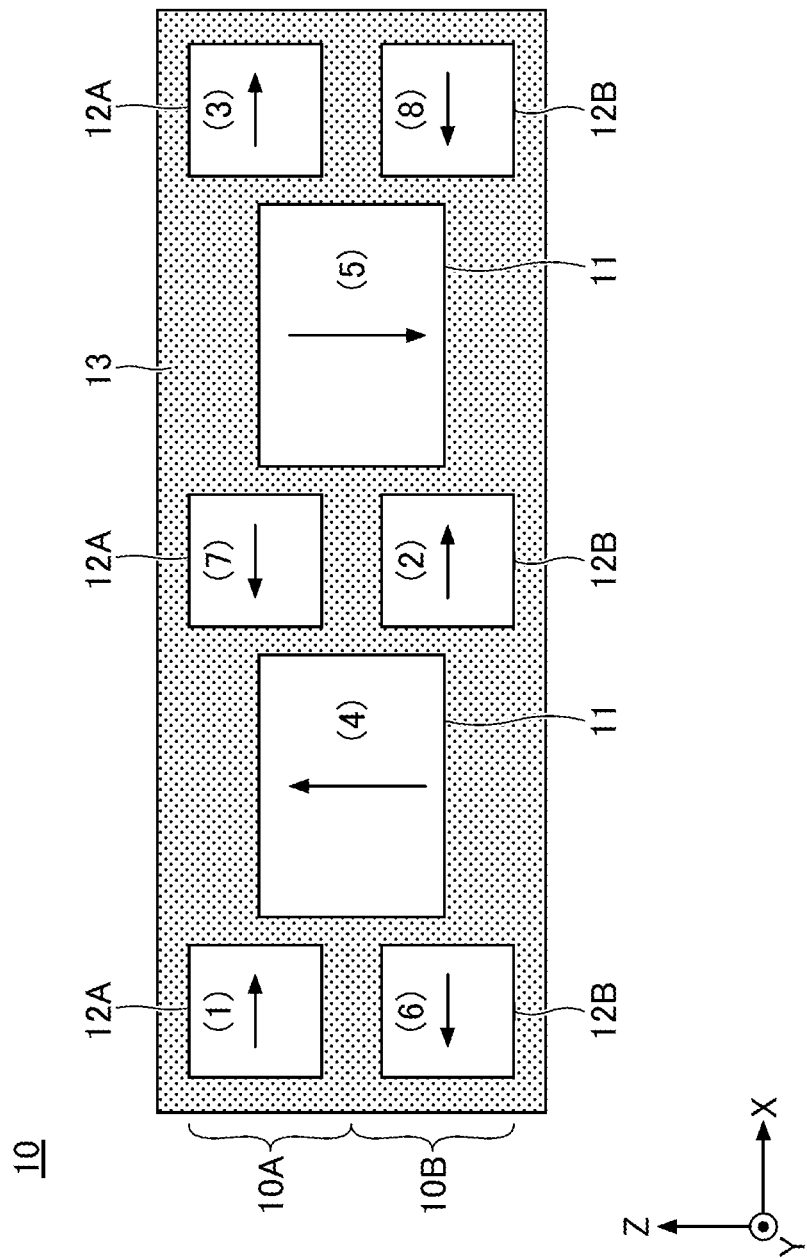

PERMANENT FIELD MAGNET, MANUFACTURING METHOD, AND LINEAR MOTOR

CROSS-REFERENCE TO RELATED APPLICATION

This application is based upon and claims priority to Japanese Patent Application No. 2020-140407, filed on Aug. 21, 2020, the entire contents of which are incorporated herein by reference.

BACKGROUND OF THE INVENTION

1. Field of the Invention

The present disclosure relates to a permanent field magnet of a linear motor.

2. Description of the Related Art

In linear motors, a conventional technique for canceling the magnetic attraction force between a permanent field magnet and an armature (i.e., a core of a soft magnetic material), is to interpose the armature between the permanent field magnets that are arranged facing each other or to interpose the permanent field magnet between the armatures that are arranged facing each other (see Patent Documents 1 and 2), for example.

Patent Document 1 describes a linear motor that includes an armature as a mover and permanent field magnet arranged such that the armature is interposed. In particular, Patent Document 1 discloses that a Halbach array is used for the permanent field magnet. This can increase the magnetic flux generated from the permanent field magnet to the armature and improve the thrust of the linear motor. Patent Document 1 also discloses that the permanent field magnet is manufactured in a form in which permanent magnets arranged in a Halbach array are inserted into a field yoke. This can facilitate the assembly of the permanent field magnet that employs a Halbach array in which a main magnet (i.e., a main pole) and an auxiliary magnet (i.e., an auxiliary pole) are required to be alternately arranged. Therefore, in Patent Document 1, the thrust of the linear motor can be increased while facilitating the assembly of the permanent field magnet.

Patent Document 2 describes a linear motor that includes a permanent field magnet as a mover and armatures, as a stator, arranged such that the permanent field magnet is interposed.

However, Patent Document 2 discloses no technique of improving the thrust of a linear motor or no technique of facilitating the assembly of a permanent field magnet when improving the thrust of a linear motor.

Therefore, in view of the above-described problem, in a linear motor configured such that a permanent field magnet is interposed by armatures, it is desirable to provide a technique of improving the thrust of the linear motor while facilitating the assembly of the permanent field magnet.

RELATED-ART DOCUMENTS

Patent Document

[Patent Document 1] Japanese Laid-open Patent Publication No. 2011-67030
[Patent Document 2] Japanese Patent No. 5313333

SUMMARY OF THE INVENTION

According to a first aspect of an embodiment, with respect to a permanent field magnet disposed between two armatures parallel to each other, the permanent field magnet includes a first field magnet section facing a first armature of the two armatures, and a second field magnet section facing a second armature of the two armatures, the second armature being different from the first armature. The first field magnet section includes a first main magnet that generates a magnetic field for the first armature and a first auxiliary magnet that increases magnetic flux of a magnetic pole of the first main magnet, the magnetic pole of the first main magnet facing the first armature. The second field magnet section includes a second main magnet that generates a magnetic field for the second armature and a second auxiliary magnet that increases magnetic flux of a magnetic pole of the second main magnet, the magnetic pole of the second main magnet facing the second armature. The first main magnet and the second main magnet, or the first auxiliary magnet and the second auxiliary magnet, are permanent magnets, the permanent magnets being magnetized in a same direction.

According to a second aspect of the embodiment, with respect to a method of manufacturing the permanent field magnet including a holding section including holes that hold multiple magnet members corresponding to the first main magnet, the second main magnet, the first auxiliary magnet, and the second auxiliary magnet, the method includes inserting some of first magnet members into corresponding holes among the holes, and then inserting second magnet members into corresponding holes among the holes. The first magnet members are either main magnet members corresponding to the first main magnet and the second main magnet or auxiliary magnet members corresponding to the first auxiliary magnet and the second auxiliary magnet included in the multiple magnet members, the second magnet members are either the main magnet members or the auxiliary magnet members, and the number of the first magnet members is greater than the number of the second magnet members.

According to a third aspect of the embodiment, a linear motor includes the permanent field magnet.

According to at least one embodiment, in the linear motor configured such that the permanent field magnet is interposed by armatures, the thrust of the linear motor can be increased while facilitating the assembly of the permanent field magnet.

BRIEF DESCRIPTION OF THE DRAWINGS

FIG. 3 is a drawing illustrating a first example of a field magnet;
FIG. 4 is a drawing describing an array of magnets.

FIG. 17 is a drawing illustrating an example of a method of assembling the fourth example of the field magnet.

DETAILED DESCRIPTION OF THE EMBODIMENTS

In the following, the embodiments will be described with reference to the drawings.

[Overview of a Linear Motor]

First, a linear motor 1 according to the present embodiment will be described with reference to FIG. 1 and FIG. 2.

The linear motor 1 according to the present embodiment may be incorporated into opening/closing mechanisms of various sliding doors, such as rail vehicle doors and station platform doors. The linear motor 1 according to the present embodiment may be mounted, for example, in a semiconductor manufacturing device.

FIRST EXAMPLE OF THE LINEAR MOTOR

Figure 1:
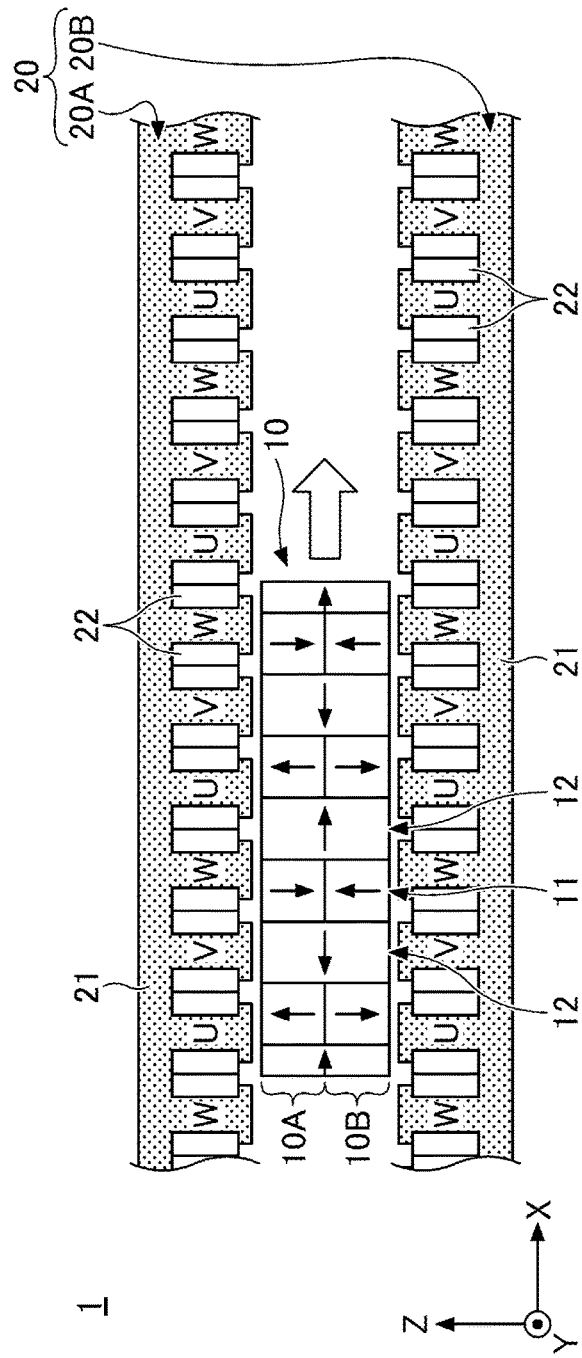
FIG. 1 is a drawing illustrating a first example of a linear motor.

FIG. 1 illustrates a first example of the linear motor 1 according to the present embodiment.

As illustrated in FIG. 1, the linear motor 1 includes a field magnet 10 and an armature 20. In FIG. 1, the arrows illustrated on the field magnet 10 represent magnetization directions of magnet members. The same applies to FIGS. 2 to 6, 8, 9, 11, 13 to 15, and 17.

The field magnet 10 (i.e., an example of a permanent field magnet) is a mover. The field magnet 10 is disposed to be interposed between armatures 20A and 20B extending along the X-axis direction. As illustrated in FIG. 1, the field magnet 10 has, for example, a rectangular shape in which the length in the X-axis direction is greater than the length in the Z-axis direction, when viewed in the Y-axis direction.

The field magnet 10 is supported to be movable in the X-axis direction, for example, by a support mechanism such as a slide rail or a linear guide. Thus, magnetically acting force between the field magnet 10 and the armature 20 enables the field magnet 10 to move in the X-axis direction between the armatures 20A and 20B.

The field magnet 10 is formed in a Halbach array and includes a main magnet 11 and an auxiliary magnet 12.

The main magnet 11 is magnetized in the Z-axis direction (i.e., the Z-axis positive direction or the Z-axis negative direction) to generate the magnetic flux for the armatures 20A and 20B. The main magnet 11 may be formed of, for example, a neodymium sintered magnet, a ferrite magnet, or the like.

The auxiliary magnets 12 are aligned adjacent to the main magnet 11 in the x-axis direction. The auxiliary magnet 12 is magnetized in the X-axis direction (i.e., the X-axis positive direction or the X-axis negative direction) to increase the magnetic flux of the magnetic poles of the surfaces, facing the armatures 20A and 20B, of the adjacent main magnet 11. The auxiliary magnet 12 may be formed of, for example, a neodymium sintered magnet, a ferrite magnet, or the like.

The number of the main magnets 11 and the auxiliary magnets 12 may be determined as desired. In the present example (FIG. 1), four main magnets 11 are arranged, and five auxiliary magnets 12 are arranged so as to be adjacent to the respective four main magnets in the X-axis positive direction and the X-axis negative direction.

The field magnet 10 also includes field magnet sections 10A and 10B.

The field magnet section 10A (i.e., an example of a first field magnet section) and the field magnet section 10B (i.e., an example of a second field magnet section) respectively generate magnetic flux for the armature 20A and the armature 20B. For example, the field magnet sections 10A and 10B respectively correspond to an approximately half portion on the Z-axis positive direction side and an approximately half portion on the Z-axis negative side in the field magnet 10.

The main magnet 11 has a functional section corresponding to the field magnet section 10A (i.e., a main magnet 11A which will be described later (an example of a first main magnet)) and a functional section corresponding to the field magnet section 10B (i.e., a main magnet 11B which will be described later (an example of a second main magnet)). As will be described later, the main magnet 11 may be able to provide functions of the main magnets 11A and 11B as a single magnet member or may be separated into two magnet members corresponding to the main magnets 11A and 11B respectively.

Similarly, the auxiliary magnet 12 has a functional section corresponding to the field magnet section 10A (i.e., an auxiliary magnet 12A which will be described later (an example of a first auxiliary magnet)) and a functional section corresponding to the field magnet section 10B (i.e., an auxiliary magnet 12B which will be described later (an example of a second auxiliary magnet)). As will be described later, the auxiliary magnet 12 may be able to provide functions of the auxiliary magnets 12A and 12B as a single magnet member, or may be separated into two magnet members corresponding to the auxiliary magnets 12A and 12B respectively.

The armature 20 is a stator. The armature 20 extends in the X-axis direction, and the length in the X-axis direction is defined in accordance with the amount of movement of the field magnet 10 as a mover in the X-axis direction.

The armature 20 includes the armatures 20A and 20B. Hereinafter, the armature 20A and 20B may be referred to collectively or either the armature 20A or the armature 20B may be individually referred to as the "armature 20X".

The armature 20A (i.e., an example of a first armature) and the armature 20B (i.e., an example of a second armature) extend along the X-axis substantially parallel to each other as described above. A predetermined space is provided between the armatures 20A and 20B in the Z-axis direction, and the space is set to be greater than the length of the field magnet 10 in the Z-axis direction to some extent. For example, the space between the armatures 20A and 20B corresponds to an amount calculated by adding the movable amount of the support mechanism (e.g., a slide rail) of the field magnet 10 in the Z-axis direction (what is called allowance) and a predetermined margin to the length of the field magnet 10 in the Z-axis direction. This enables the field magnet 10 as a mover to move in the X-axis direction without contacting the armatures 20A and 20B.

Each of the armatures 20A and 20B includes a core 21 and a coil 22.

The core 21 includes a back yoke that extends in the X-axis direction and multiple teeth protruding in the Z-axis direction toward the field magnet 10 from the back yoke. The multiple teeth are arranged at substantially equal intervals in the X-axis direction in accordance with the number of coils 22 provided.

The coil 22 is formed of a wire that is wound around each tooth of the core 21 and flows the armature current. With respect to the coils 22 arranged in the X-axis direction, the armature current, which is U phase, V phase, and W phase of three-phase electric power, is supplied to each coil group that is a combination of three adjacent coils 22.

The number of the coils 22 of each of the armatures 20A and 20B (i.e., the number of the teeth of the core 21) may be determined as desired and may be appropriately set in accordance with the length of the armature 20A acting as a stator in the X-axis direction, the specification of the linear motor 1, and the like.

As described, in the present example, in the linear motor 1, the field magnet 10 can be moved in the X-axis direction by the interaction between the magnetic fields generated by the field magnet 10 for the armatures 20A and 20B and the magnetic field caused by the armature current supplied to the coils 22 of the armatures 20A and 20B.

SECOND EXAMPLE OF THE LINEAR MOTOR

Figure 2:
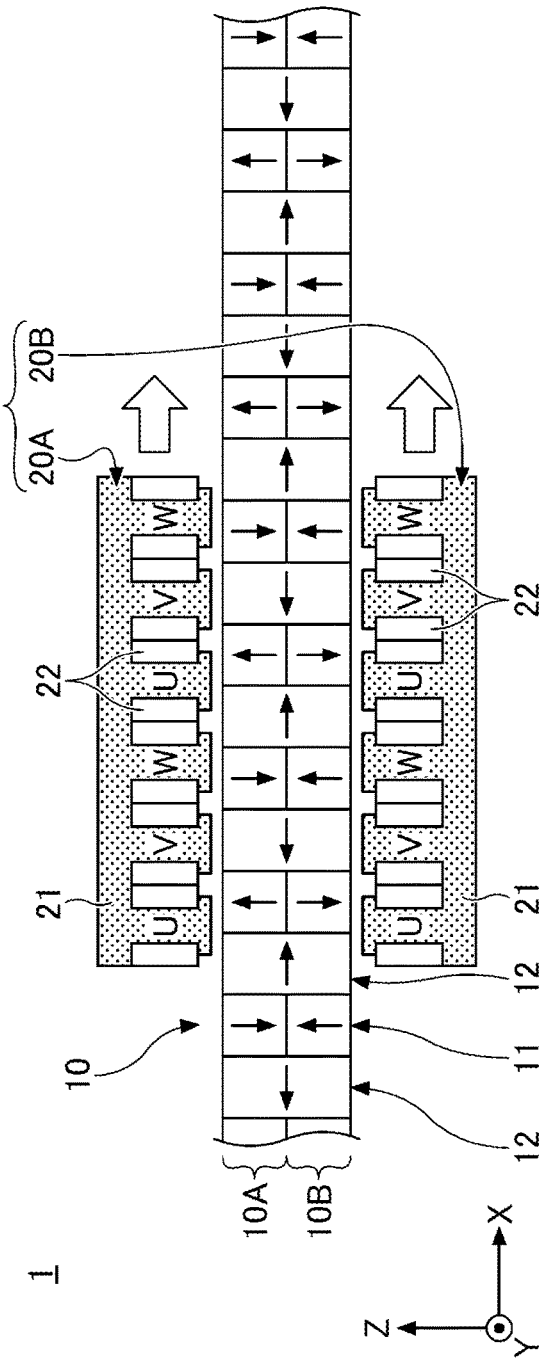
FIG. 2 is a drawing illustrating a second example of the linear motor.

FIG. 2 illustrates a second example of the linear motor 1 according to the present embodiment.

As illustrated in FIG. 2, in the second example, in contrast to the first example, the field magnet 10 is a stator and the armature 20 is a mover.

The field magnet 10 has a predetermined thickness in the Z-axis direction (e.g., a thickness substantially the same as the field magnet 10 acting as a mover in the above-described example) and extends in the X-axis direction. The length of the field magnet 10 in the X-axis direction is longer than the length of the armature 20 in the X-axis direction acting as a mover and is defined in accordance with the amount of movement of the armature 20.

As in the first example, the field magnet 10 is formed in a Halbach array and includes the main magnet 11 and the auxiliary magnet 12.

As in the first example, the main magnet 11 and the auxiliary magnet 12 are alternately arranged in the X-axis direction. In the present example, a necessary number of the main magnets 11 and the auxiliary magnets 12 are provided in accordance with the length required as the field magnet 10 in the X-axis direction.

As in the first example, the field magnet 10 includes the field magnet sections 10A and 10B.

As in the first example, the armature 20 includes the armatures 20A and 20B.

The armatures 20A and 20B are arranged at predetermined intervals in the Z-axis direction such that the field magnet 10 serving a stator is interposed in the Z-axis direction. The armatures 20A and 20B are coupled, for example, in a plane perpendicular to the X-axis direction, such that the armature 20 holds the field magnet 10, and the armatures 20A and 20B are supported, for example, by a support mechanism, such as a slide rail, such that the armatures 20A and 20B can be integrally moved in the X-axis direction. Thus, the armature 20 can be moved in the X-axis direction (i.e., the direction in which the field magnet 10 extends) by the magnetically acting force between the armature 20 and the field magnet 10 in a state in which the field magnet 10 is surrounded.

As in the first example, each of the armature 20A and 20B includes the core 21 and the coil 22.

As in the first example, the core 21 includes the back yoke that extends in the X-axis direction and multiple teeth that protrude in the Z-axis direction toward the field magnet 10 from the back yoke.

As in the first example, a given number of the coils 22 may be arranged in the X-axis direction in each of the armatures 20A and 20B. In the present example (FIG. 2), two combinations of a coil group of three adjacent coils 22 are provided, i.e., six coils 22 are provided in each of the armatures 20A and 20B.

As described, in the present example, in the linear motor 1, the armature 20 can be moved in the X-axis direction by the interaction between the magnetic field generated by the field magnet 10 for the armatures 20A and 20B and the magnetic field caused by the armature current supplied to the coils 22 of the armatures 20A and 20B.

[Details of the Field Magnet]

Next, with reference to FIGS. 3 to 17, the field magnet 10 of the linear motor 1 according to the present embodiment will be described in detail.

In the following, the field magnet 10 in the linear motor 1 of one above-described example, that is, the field magnet 10 serving a mover, will be mainly described. However, as a matter of course, the substantially same configuration can be applied to the field magnet 10 in the linear motor 1 of another example described above, that is, the field magnet 10 serving a stator.

FIRST EXAMPLE OF THE FIELD MAGNET

Figure 5:
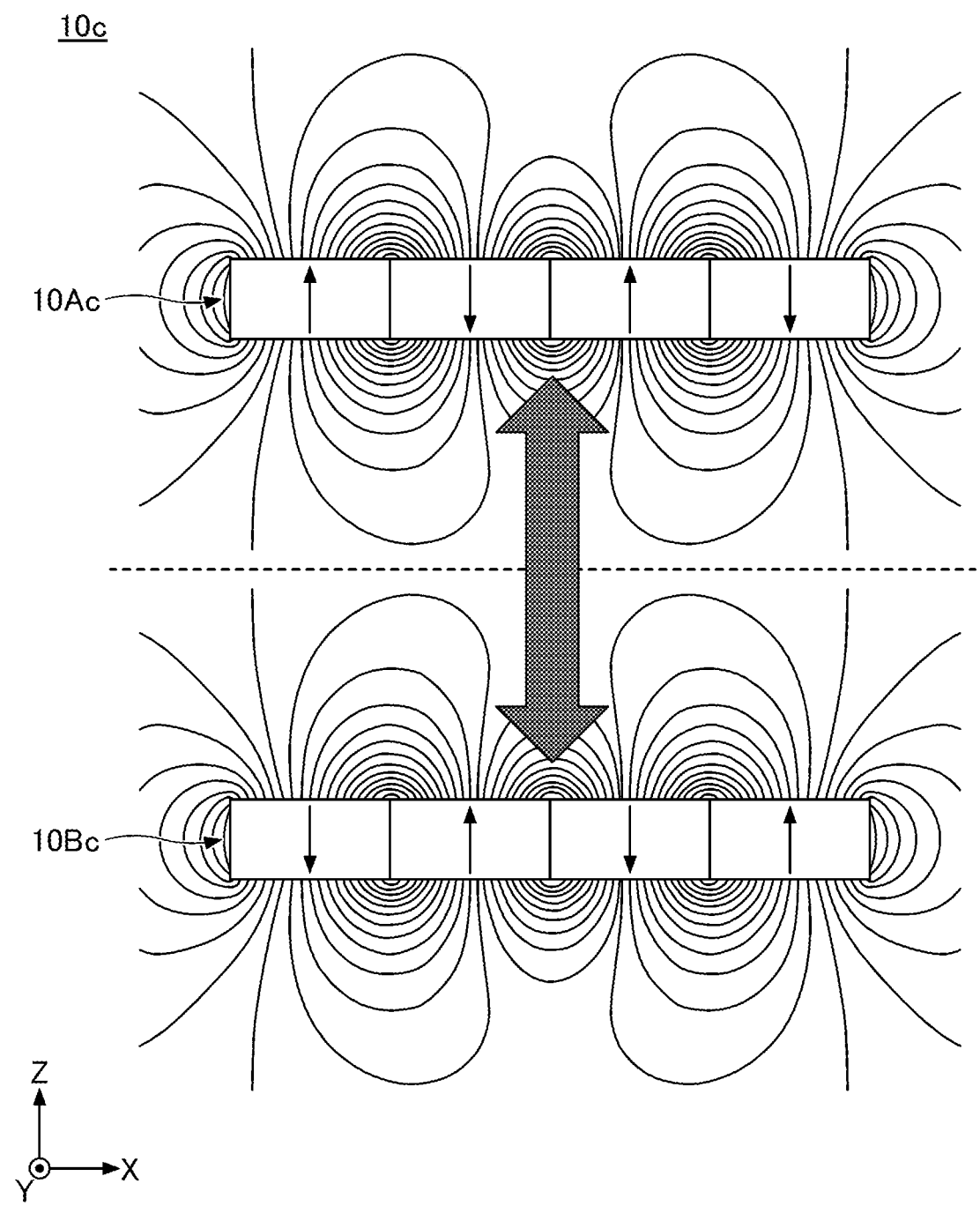
FIG. 5 is a drawing illustrating magnetic flux distribution of a field magnet according to a first comparative example.
Figure 6:
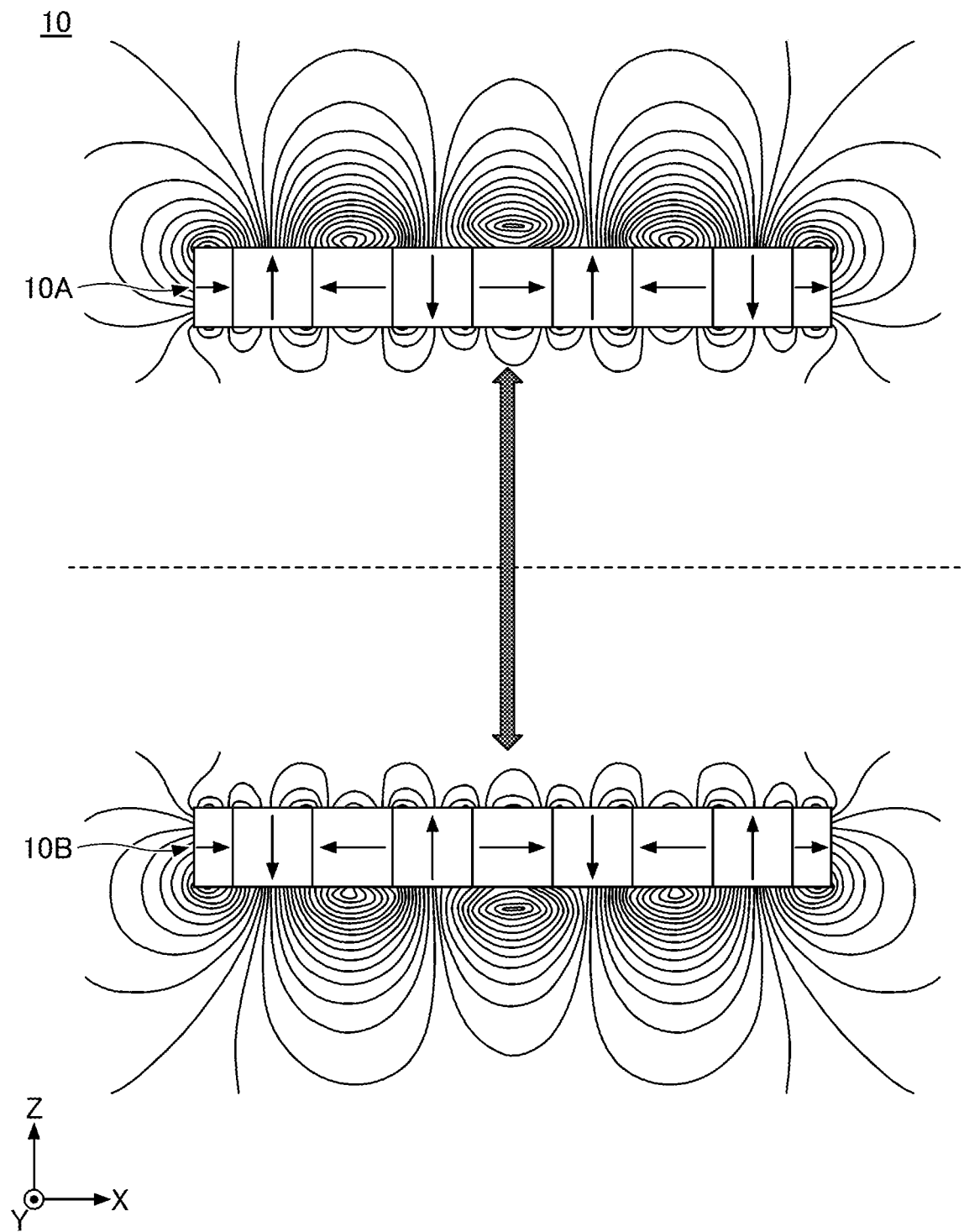
FIG. 6 is a drawing illustrating magnetic flux distribution of a field magnet according to an embodiment (a first example)
Figure 7:
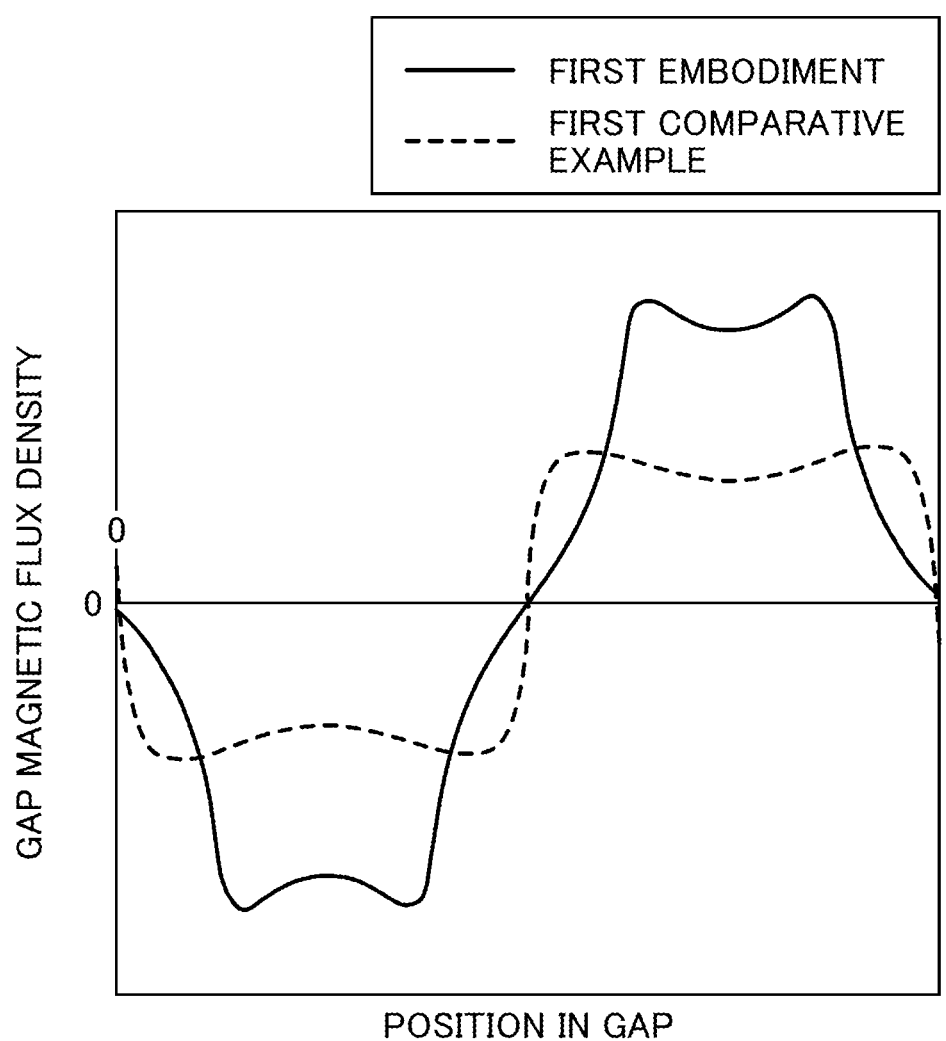
FIG. 7 is a graph illustrating a first example of a magnetic flux density generated in a gap.

FIG. 3 is a drawing illustrating a first example of the field magnet 10 according to the present embodiment. FIG. 4 is a drawing describing an array of magnets of the field magnet 10 according to the present embodiment. Specifically, FIG. 4 is a drawing illustrating the arrangement of magnets (i.e., the main magnets 11A and 11B and the auxiliary magnets 12A and 12B) for each of the field magnet sections 10A and 10B. FIG. 5 is a drawing illustrating the magnetic flux distribution of a field magnet 10c according to a first comparison example. FIG. 6 is a drawing illustrating the magnetic flux distribution of the field magnet 10 according to the present embodiment. FIG. 7 is a drawing illustrating a first example of the magnetic flux density generated in a gap between the field magnet 10 and the armature 20A and 20B (hereinafter, referred to as a "gap magnetic flux density"). Specifically, FIG. 7 is a drawing illustrating a comparison between the gap magnetic flux density of the field magnet 10 according to the present example and the gap magnetic flux density of the field magnet 10c according to the first comparison example.

As illustrated in FIG. 3, in the present example, the field magnet 10 includes the main magnets 11A and 11B that respectively correspond to the field magnet sections 10A and 10B configured as separate magnet members and the auxiliary magnets 12 configured as a single magnet member. The magnet members that respectively correspond to the main magnets 11A and 11B may be, for example, substantially rectangular shaped when viewed in the Y-axis direction and occupy ranges corresponding to the field magnet section 10A and the field magnet section 10B in the Z-axis direction. The magnet member corresponding to the auxiliary magnet 12 may be substantially rectangular shaped when viewed in the Y-axis direction and occupies a range throughout the field magnet sections 10A and 10B (i.e., the entirety of the field magnet 10) in the Z-axis direction.

In the present example, the field magnet 10 is configured such that the main magnet 11 (i.e., a combination of the main magnets 11A and 11B) and the auxiliary magnet 12 are alternately arranged in the X-axis direction and includes four main magnets 11 and five auxiliary magnets 12. The field magnet 10 may, for example, be configured such that adjacent main magnets 11A and 11B and auxiliary magnets 12 are coupled with each other by adhesives or the like. In the following, the same may apply to a second example described later.

As illustrated in FIG. 4, in the field magnet section 10A, the four main magnets 11A and the five auxiliary magnets 12A are arranged in a Halbach array. Specifically, the four main magnets 11A and the five auxiliary magnets 12A are arranged alternately in the X-axis direction. Among these, the main magnet 11A is arranged so that the magnetization direction is opposite in the Z-axis direction to the magnetization directions of adjacent main magnets 11A with the auxiliary magnet 12A being interposed therebetween in the X-axis direction (i.e., the magnetic poles of the surfaces facing the armature 20A are different). The auxiliary magnet 12A is arranged so that, if the magnetization direction of the main magnet 11A adjacent in the X-axis direction is toward the armature 20A in the Z-axis direction, the magnetization direction is in the X-axis direction and toward the main magnet 11A. With respect to this, the auxiliary magnet 12A is arranged so that, if the magnetization direction of the main magnet 11A adjacent in the X-axis direction is in a direction away from the armature 20A in the Z-axis direction, the magnetization direction is in the X-axis direction and in a direction away from the main magnet 11A. The same applies to the four main magnets 11B and the five auxiliary magnets 12B of the field magnet section 10B.

Here, as illustrated in FIG. 3 and FIG. 4, the main magnets 11A and 11B that are arranged in the same position in the X-axis direction are magnetized in the Z-axis direction and in a direction different from each other. That is, the main magnets 11A and 11B are arranged such that a combination of magnetization directions toward the armature 20A and 20B that the main magnets 11A and 11B face and a combination of magnetization directions away from the armature 20A and 20B that the main magnets 11A and 11B face are alternately arranged in the X-axis direction. Thus, as illustrated in FIG. 4, a combination of the auxiliary magnets 12A and 12B adjacent to the combination of the main magnets 11A and 11B always has the same magnetization direction. Therefore, in the present example, as illustrated in FIG. 3, the auxiliary magnets 12A and 12B, disposed at the same position in the X-axis direction, having the same magnetization direction, can be integrated into the auxiliary magnet 12 as a single magnet member. As a result, the number of components of the magnet members included in the field magnet 10 is reduced, and the assembly of the field magnet 10 employing a Halbach array can be facilitated.

Additionally, for example, as illustrated in FIG. 5, in the field magnet 10c according to the first comparative example, a Halbach array is not employed, and the field magnet 10c is configured by using only the magnet members corresponding to the main magnets 11A and 11B. Therefore, in field magnet sections 10Ac and 10Bc of the field magnet 10c according to the first comparative example, the substantially same magnetic flux distribution is generated on each side in the Z-axis direction. In the field magnet sections 10Ac and 10Bc, as with the field magnets 10 in the present example, the main magnets 11A and 11B have opposite magnetization directions. Thus, when the field magnet sections 10Ac and 10Bc are bonded (e.g., pasted), a significantly strong repulsion force is applied between the bonding surfaces of the field magnet sections 10Ac and 10Bc, thereby complicating the assembly of the field magnet 10c.

With respect to the above, as illustrated in FIG. 6, in the field magnet sections 10A and 10B in which the Halbach array is employed, the magnetic flux of the magnetic poles of the surfaces respectively facing the armatures 20A and 20B in the Z-axis direction is relatively increased while the magnetic flux of the magnetic poles of the respective bonding surfaces is relatively reduced. Therefore, when the field magnet sections 10A and 10B are bonded, the repulsion force acting between the bonding surfaces of the field magnet sections 10A and 10B is reduced, and the assembly of the field magnets 10 can be facilitated.

As illustrated in FIG. 7, because the field magnet 10 according to the present example employs a Halbach array, the magnetic flux density generated in the gap between the armatures 20X (i.e., gap magnetic flux density) is greater in comparison with the field magnet 10c according the first comparative example in which the Halbach array is not employed. For example, in the field magnet 10c according to the first comparative example, only the gap magnetic flux density that is below the residual magnetic flux density of the main magnets 11A and 11B can be generated. With respect to this, in the field magnet 10 according to the present example, the gap magnetic flux density exceeding the residual magnetic flux density of the main magnets 11A and 11B can be generated by the action caused by the auxiliary magnet 12. Therefore, the thrust of the linear motor 1 can be increased.

As illustrated in FIG. 7, in the field magnet 10 according to the present example, the waveform of the gap magnetic flux density with respect to the position in the X-axis direction is closer to a sine wave in comparison with the waveform of the gap magnetic flux density in the field magnet 10c according to the first comparison example. Therefore, in the present example, the field magnet 10 can suppress the harmonic component of the gap magnetic flux density.

SECOND EXAMPLE OF THE FIELD MAGNET

Figure 8:
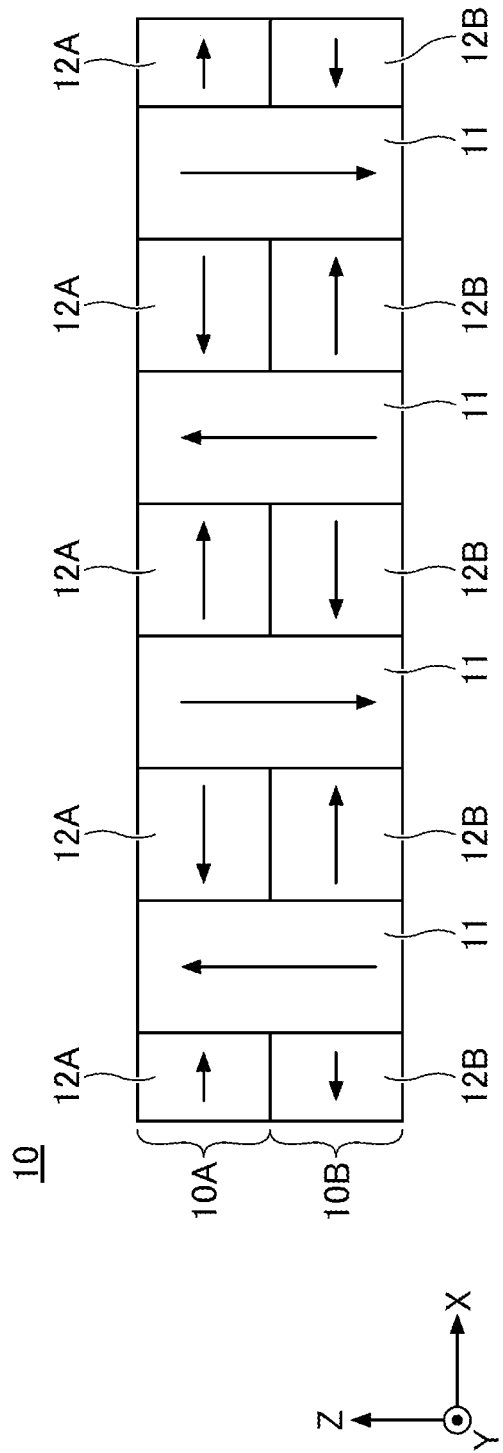
FIG. 8 is a drawing illustrating a second example of the field magnet.
Figure 9:
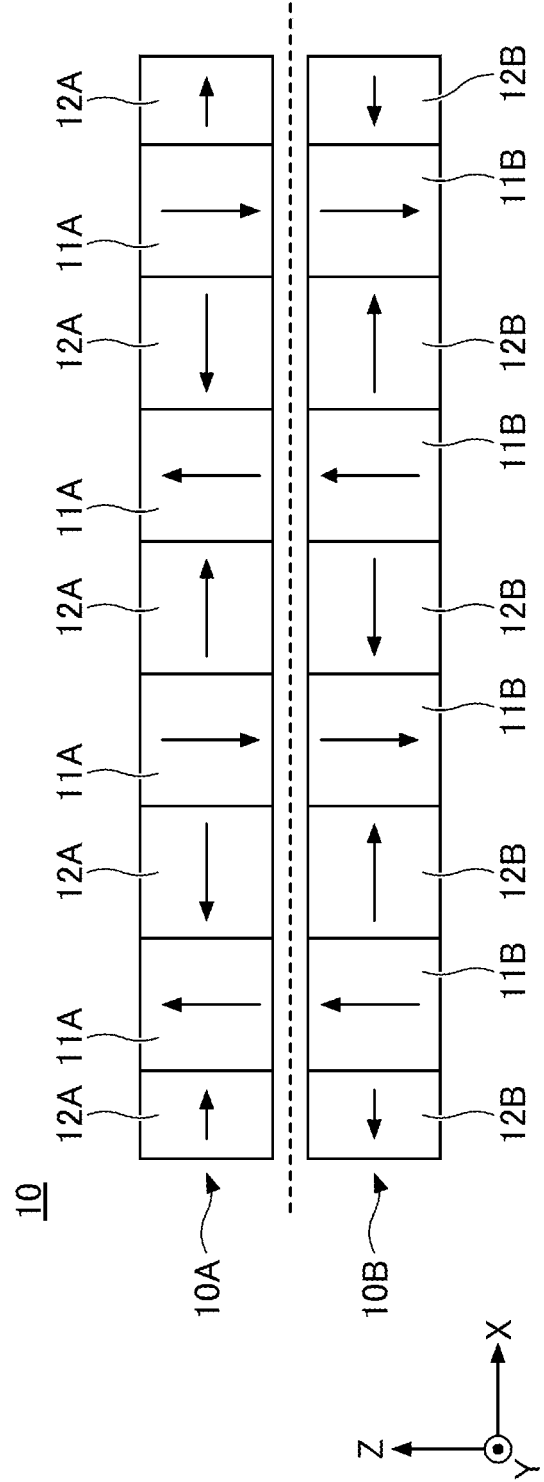
FIG. 9 is a drawing describing an array of magnets.
Figure 10:
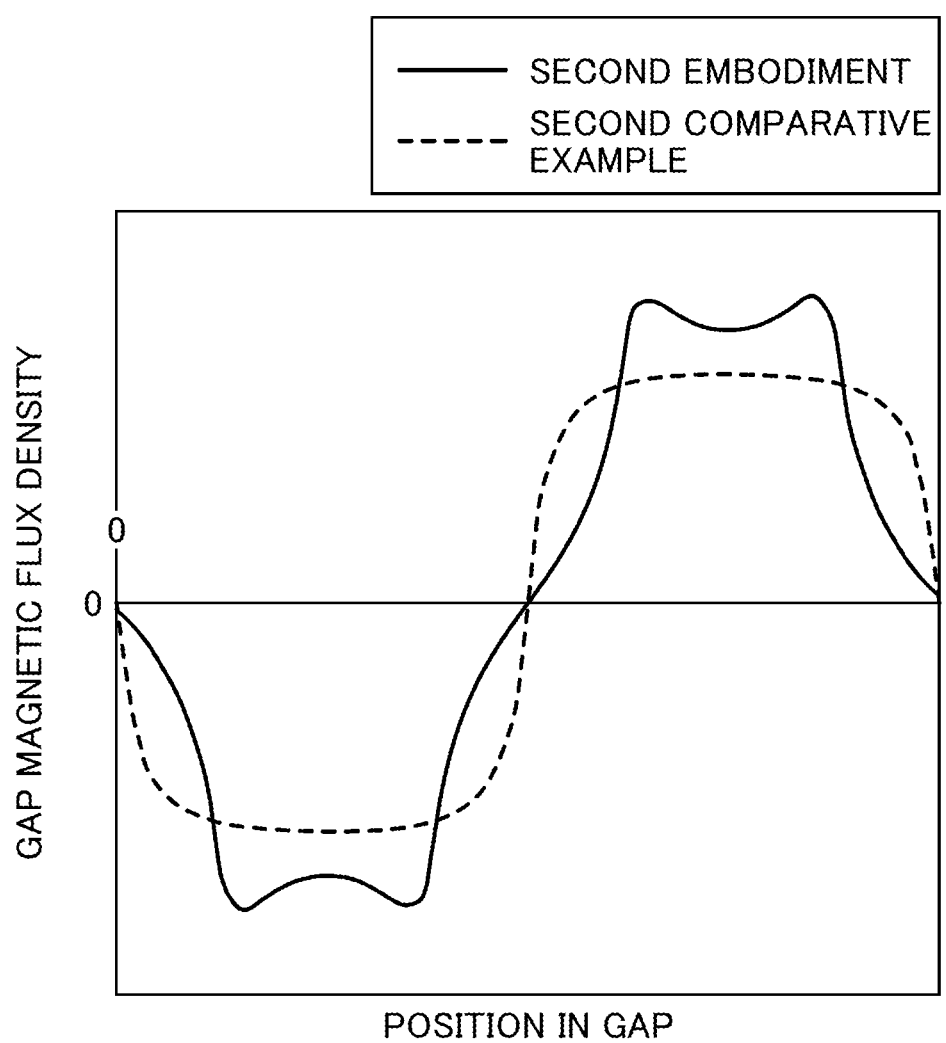
FIG. 10 is a graph illustrating a second example of the magnetic flux density generated in the gap.

FIG. 8 is a drawing illustrating a second example of the field magnet 10 according to the present embodiment. FIG. 9 is a drawing illustrating an array of magnets of the field magnet 10 according to the present example. Specifically, FIG. 9 is a drawing illustrating the arrangement of magnets (i.e., the main magnets 11A and 11B and the auxiliary magnets 12A and 12B) for each of the field magnet sections 10A and 10B. FIG. 10 is a graph illustrating a second example of the gap magnetic flux density between the field magnet 10 and the armatures 20A and 20B. Specifically, FIG. 10 is a drawing illustrating a comparison between the gap magnetic flux density of the field magnet 10 according to the present example and the gap magnetic density of the field magnet according to the second comparative example. In the field magnet according to the second comparative example, unlike the field magnet 10 according to the present example (FIG. 8), a Halbach array is not employed, and only the magnet members corresponding to the main magnet 11 of the field magnet 10 according to the present example are arranged in the X-axis direction.

As illustrated in FIG. 8, in the present example, the field magnet 10 includes the main magnet 11 configured as a single magnet member and the auxiliary magnets 12A and 12B, configured as separate magnet members, that respectively correspond to the field magnet sections 10A and 10B. For example, the magnet member corresponding to the main magnet 11 may be substantially rectangular shaped when viewed in the Y-axis direction and occupies a range throughout the field magnet sections 10A and 10B in the Z-axis direction (i.e., the entirety of the field magnet 10). The magnet members respectively corresponding to the auxiliary magnets 12A and 12B may be substantially rectangular shaped when viewed in the Y-axis direction and occupy a range corresponding to the field magnet sections 10A and 10B in the Z-axis direction.

In the present example, the field magnet 10 is configured such that the main magnet 11 and the auxiliary magnet 12 (i.e., a combination of the auxiliary magnets 12A and 12B) are alternately arranged in the X-axis direction, as in the first example described above, and includes the four main magnets 11 and the five auxiliary magnets 12.

As illustrated in FIG. 9, in the field magnet section 10A, the four main magnets 11A and the five auxiliary magnets 12A are arranged in a Halbach array, as in the first example described above. Similarly, in the field magnet section 10B, the four main magnets 11B and the five auxiliary magnets 12B are arranged in a Halbach array, as in the first example described above.

Here, as illustrated in FIG. 9, the main magnets 11A and 11B disposed at the same position in the X-axis direction are magnetized in the Z-axis direction and in the same direction. That is, the main magnets 11A and 11B are arrayed such that one of the magnetization directions is in a direction toward a surface facing the armature 20X and the other magnetization direction is in a direction away from the surface facing the armature 20X. Therefore, in the present example, as illustrated in FIG. 8, the main magnets 11A and 11B, disposed at the same position in the X-axis direction, having the same magnetization direction, can be integrated in the main magnet 11 as a single magnet member. Therefore, the number of components of the magnet members included in the field magnet 10 is reduced, and the assembly of the field magnet 10 employing a Halbach array can be facilitated.

With respect to the above, as illustrated in FIG. 8 and FIG. 9, the magnetization directions of the auxiliary magnets 12A and 12B are in opposite directions along the X-axis direction. Therefore, as illustrated in FIG. 8, the auxiliary magnets 12A and 12B are configured as two magnet members that are separate from each other.

As illustrated in FIG. 10, because the field magnet 10 according to the present example employs a Halbach array, as in the above-described first example, the gap magnetic flux density is greater than the gap magnetic flux density of the field magnet of the second comparative example in which a Halbach array is not employed. Therefore, as in the above-described first example, the thrust of the linear motor 1 can be increased.

As illustrated in FIG. 10, in the field magnet 10 of the present example, as in the above-described first example, the waveform of the gap magnetic flux density with respect to the position in the X-axis direction is closer to a sine wave in comparison with the waveform of the gap magnetic flux density in the field magnet of the second comparative example. Therefore, in the present example, the field magnet 10 can suppress the harmonic component of the gap magnetic flux density.

THIRD EXAMPLE OF THE FIELD MAGNET

Figure 11:
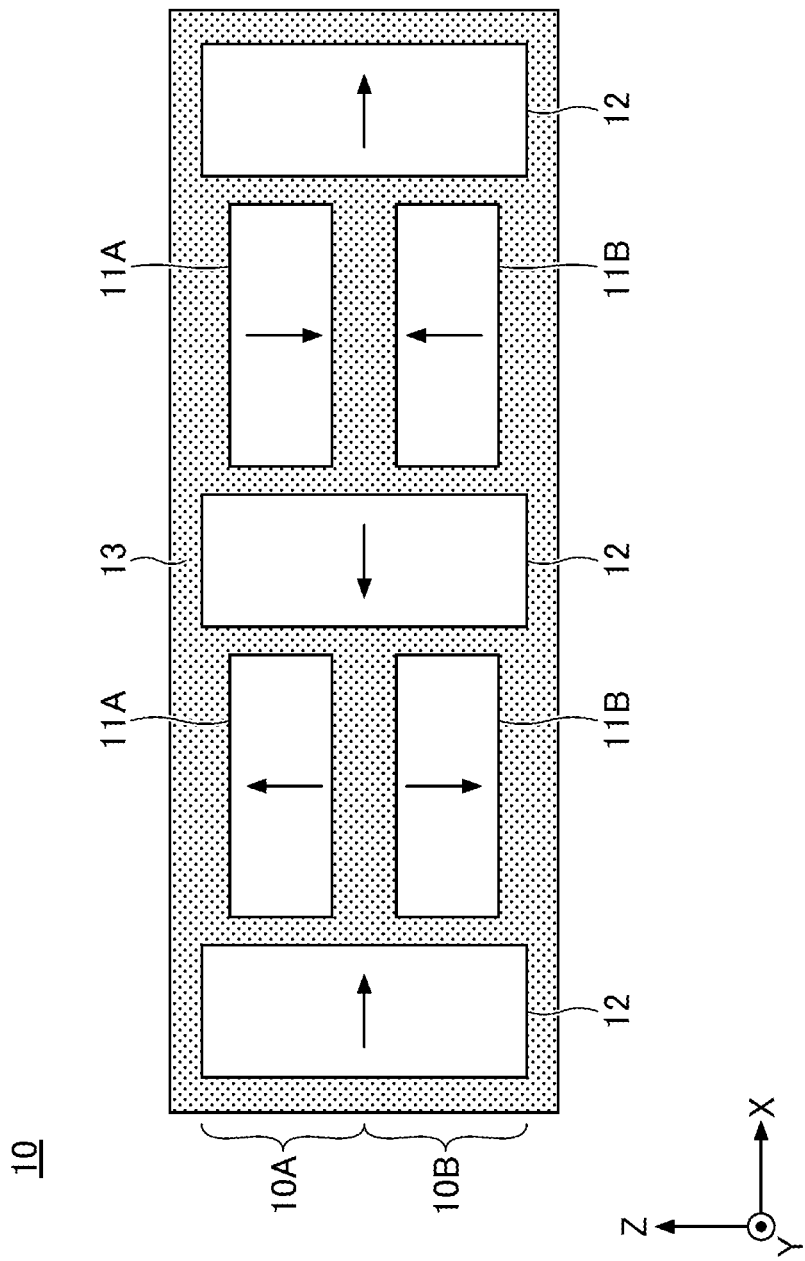
FIG. 11 is a drawing illustrating a third example of the field magnet.
Figure 12:
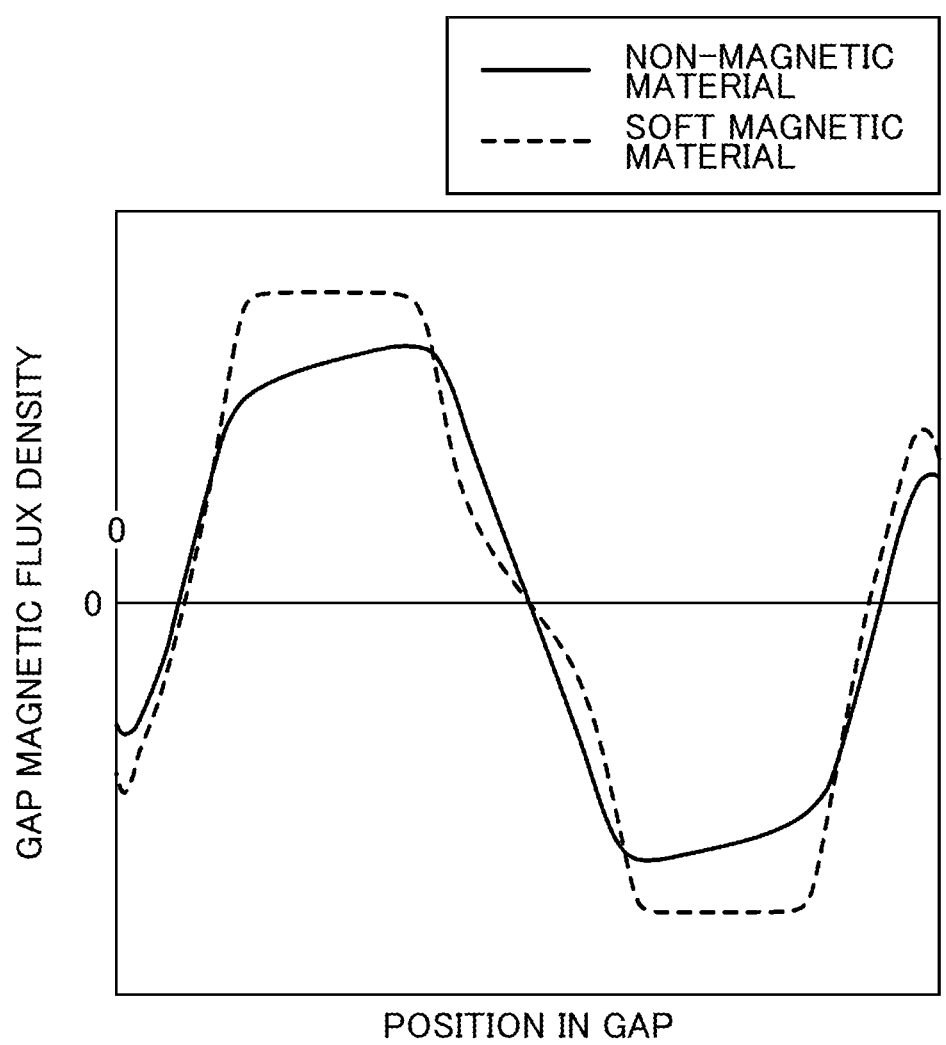
FIG. 12 is a graph illustrating a third example of the magnetic flux density generated in the gap.
Figure 13:
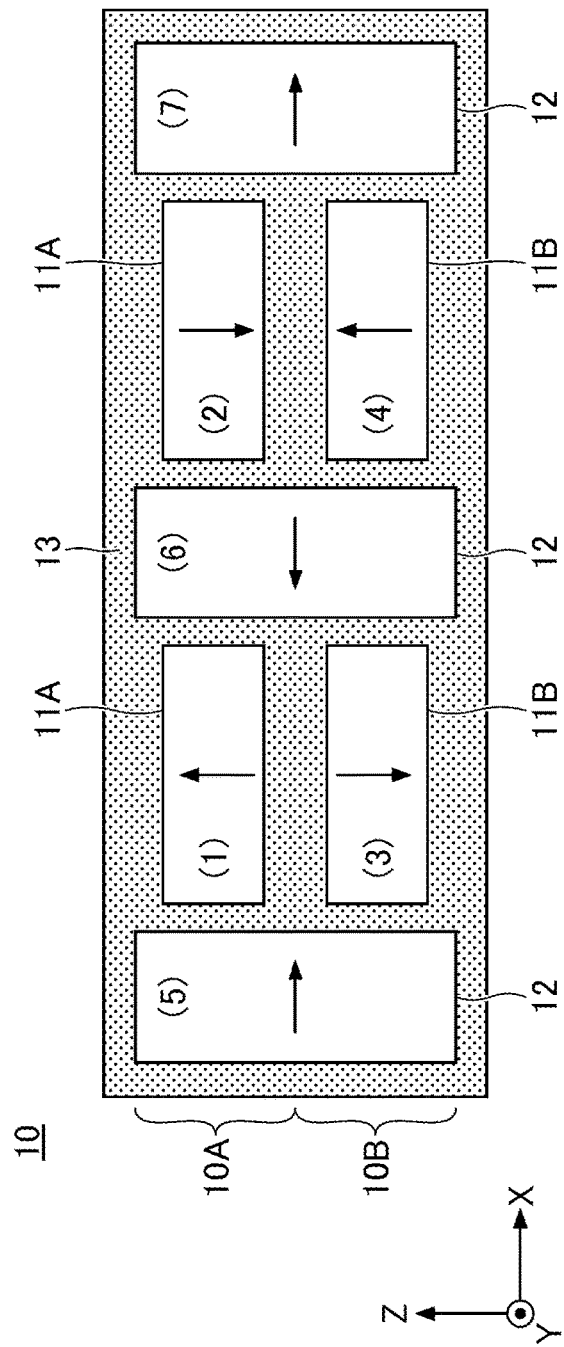
FIG. 13 is a drawing illustrating a comparative example of a method of assembling the third example of the field magnet.
Figure 14:
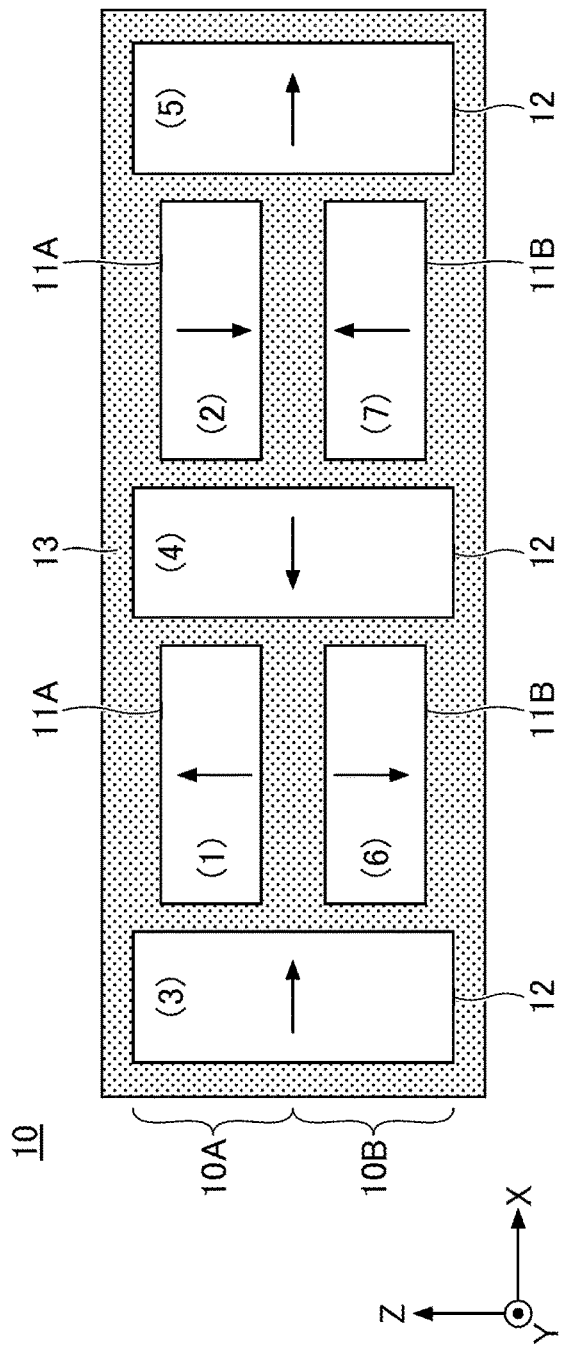
FIG. 14 is a drawing illustrating an example of the method of assembling the third example of the field magnet.

FIG. 11 is a drawing illustrating a third example of the field magnet 10 according to the present embodiment. FIG. 12 is a graph illustrating a third example of the gap magnetic flux density between the field magnet 10 and the armatures 20A and 20B. Specifically, FIG. 12 is a graph illustrating a comparison between the gap magnetic flux density in a case where a holding section 13 is made of a non-magnetic material and the gap magnetic flux density in a case where the holding section 13 is made of a soft magnetic material. FIG. 13 is a drawing illustrating a comparative example of a method of assembling the field magnet 10 according to the present example. FIG. 14 is a drawing illustrating an example of the method of assembling the field magnet 10 according to the present example. In FIG. 13 and FIG. 14, the order of inserting multiple magnet members corresponding to the main magnet 11A, the main magnet 11B, and the auxiliary magnet 12 into holes of the holding section 13 (hereinafter referred to as "magnet holes") is described in numerals with parentheses.

As illustrated in FIG. 11, in the present example, as in the first example above, the field magnet 10 includes the main magnets 11A and 11B respectively corresponding to the field magnet sections 10A and 10B that are configured as separate magnet members and the auxiliary magnet 12 that is configured as a single magnet member. Additionally, in the present example, the field magnet 10 includes the holding section 13.

In the present example, the field magnet 10 is configured such that the main magnet 11 (i.e., a combination of the main magnets 11A and 11B) and the auxiliary magnet 12 are alternately arranged in the X-axis direction, and includes the two main magnets 11 and the three auxiliary magnets 12.

As illustrated in FIG. 11, in the holding section 13, the holes (i.e., the magnet hole) in which multiple magnet members (i.e., seven magnet members in the present example) respectively corresponding to the main magnet 11A, the main magnet 11B, and the auxiliary magnet 12 are embedded are provided. For example, the holding section 13 has a substantially rectangular shape in which the length in the X-axis direction is longer than the length in the Z-axis direction, when viewed in the Y-axis direction, and has the magnet holes through which the magnet members respectively corresponding to the main magnet 11A, the main magnet 11B, and the auxiliary magnet 12 can be inserted in the Y-axis direction. Specifically, two magnet holes, respectively corresponding to the main magnets 11A and 11B, arranged in the Z-axis direction, and one magnet hole, corresponding to the auxiliary magnet 12, provided in a range between both ends of the holding section 13 in the Z-axis direction, are alternately arranged in the X-axis direction. This enables the holding section 13 to hold the main magnet 11A, the main magnet 11B, and the auxiliary magnet 12 through the magnet holes. Therefore, a situation in which the magnet members corresponding to the main magnet 11A, the main magnet 11B, and the auxiliary magnet 12 are separated from the field magnet 10, due to, for example, an impact or the like acting on the field magnet 10, can be prevented. When the field magnet 10 is manufactured, an operator can manufacture the field magnet 10 by inserting the corresponding magnet members into the magnet holes provided in the holding section 13. Therefore, the assembly of the field magnet 10 can be facilitated.

The holding section 13 may be made of, for example, a non-magnetic material. The non-magnetic material may be, for example, stainless steel, resin, or the like. This can prevent the generation of magnetic attraction between the holding section 13 and the magnet members corresponding to the main magnet 11A, the main magnet 11B, and the auxiliary magnet 12. Therefore, the assembly of the field magnet 10 can be further facilitated.

Alternatively, the holding section 13 may be made of, for example, a soft magnetic material. The soft magnetic material may be, for example, an electrical steel plate, and the holding section 13 may be configured by laminating the electrical steel plates. The holding section 13 may also be configured by, for example, integrally molding with another soft magnetic steel. The soft magnetic material may be, for example, a powder magnetic core. As illustrated in FIG. 12, this can relatively increase the gap magnetic flux density of the field magnet 10. Therefore, the thrust of the linear motor 1 can be further increased while the assembly of the field magnet 10 is facilitated.

For example, as illustrated in FIG. 13, steps, in which the main magnets 11A and 11B are all inserted into the holding section 13 (i.e., the magnet holes) in the order of (1) to (4), and the remaining auxiliary magnets 12 are inserted into the holding section 13 (i.e., the magnet holes) in the order of (5) to (7), are considered. In this case, because the magnetization direction of the main magnet 11B inserted in step (3) is opposite to the magnetization direction of the main magnet 11A inserted in step (1), the repulsion force acts from the main magnet 11A when the main magnet 11B is inserted into the holding section 13. Similarly, because the magnetization direction of the main magnet 11B inserted in step (4) is opposite to the magnetization direction of the main magnet 11A inserted in step (2), the repulsion force acts from the main magnet 11A when the main magnet 11B is inserted into the holding section 13. Therefore, the assembly of the field magnet 10 may be complicated.

With respect to the above, in the present example, as illustrated in FIG. 14, the main magnets 11A are inserted into the holding section 13 (i.e., the magnet holes) in the order of (1) and (2), and then the auxiliary magnets 12 are inserted into the holding section 13 (i.e., the magnet holes) in the order of (3) to (5). Finally, the remaining main magnets 11B are inserted into the holding section 13 (i.e., the magnet holes) in the order of (6) and (7). In this case, with respect to the main magnet 11A previously inserted, when the auxiliary magnet 12 is inserted into the holding section 13 (i.e., the magnet hole), the magnetic flux of the magnetic pole of the surface facing the armature 20A increases while the magnetic flux of the magnetic pole of the surface facing the main magnet 11B, which is in a direction opposite to the magnetic flux of the magnetic pole of the surface facing the armature 20A, is reduced, due to the action caused by Halbach array. Thus, when the remaining main magnets 11B are inserted into the holding section 13 (i.e., the magnet holes), the repulsion force between the magnets is reduced. Therefore, when the field magnet 10 is manufactured, an operator can easily insert the main magnet 11B into the holding section 13 (i.e., the magnetic holes), thereby facilitating the assembly of the field magnet 10.

As described, some of the magnet members corresponding to the main magnets 11 separated into two magnet members are first inserted into the holding section 13, and then the auxiliary magnets 12 are inserted into the holding section 13. This can reduce the magnetic force acting from other magnet members already inserted (specifically, the magnet members corresponding to the main magnets 11), when the magnet members corresponding to the remaining main magnets 11 are inserted into the holding section 13 (i.e., the magnet holes). Therefore, the assembly of the field magnet 10 can be facilitated.

The order of inserting the multiple magnet members corresponding to the main magnet 11A, the main magnet 11B, and the auxiliary magnet 12 may be appropriately optimized to facilitate the assembly through, for example, experiments, simulations, or the like. The same may apply to the method of assembling the field magnet 10 of a fourth example described later.

FOURTH EXAMPLE OF THE FIELD MAGNET

Figure 15:
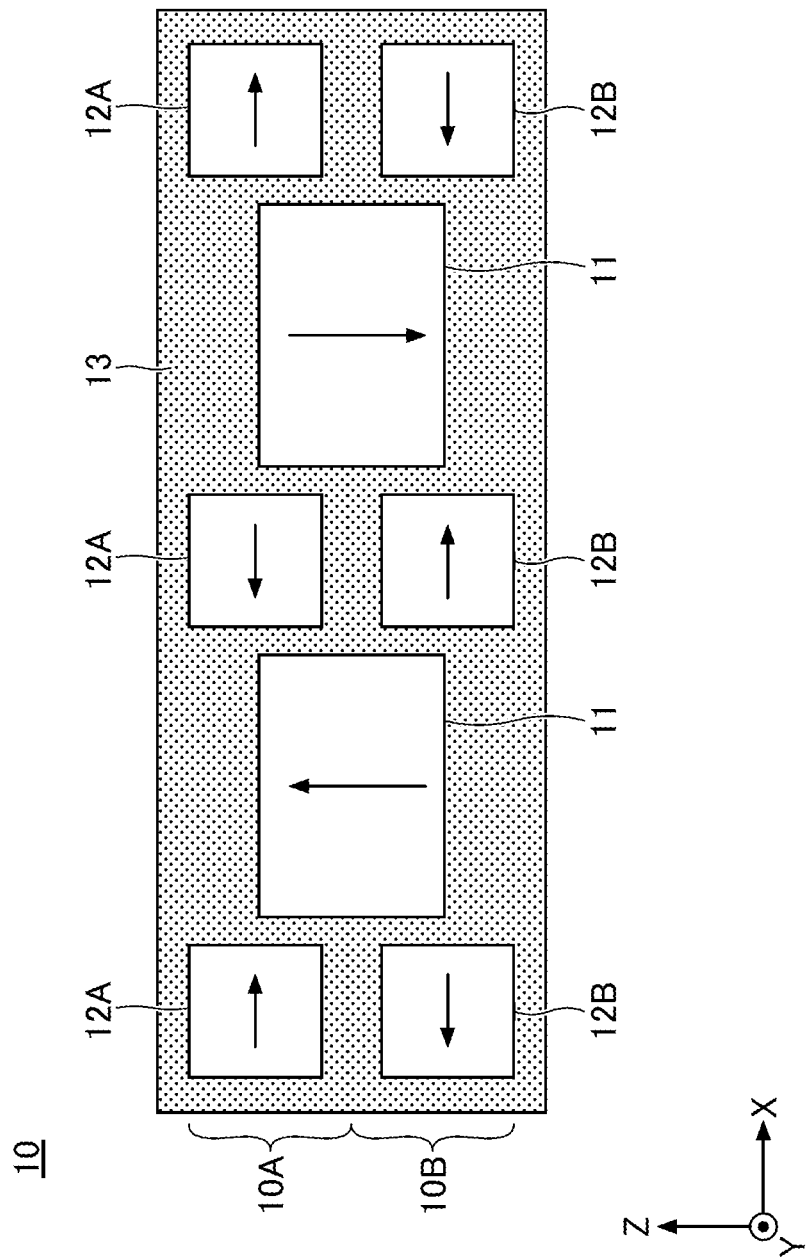
FIG. 15 is a drawing illustrating a fourth example of the field magnet.
Figure 16:
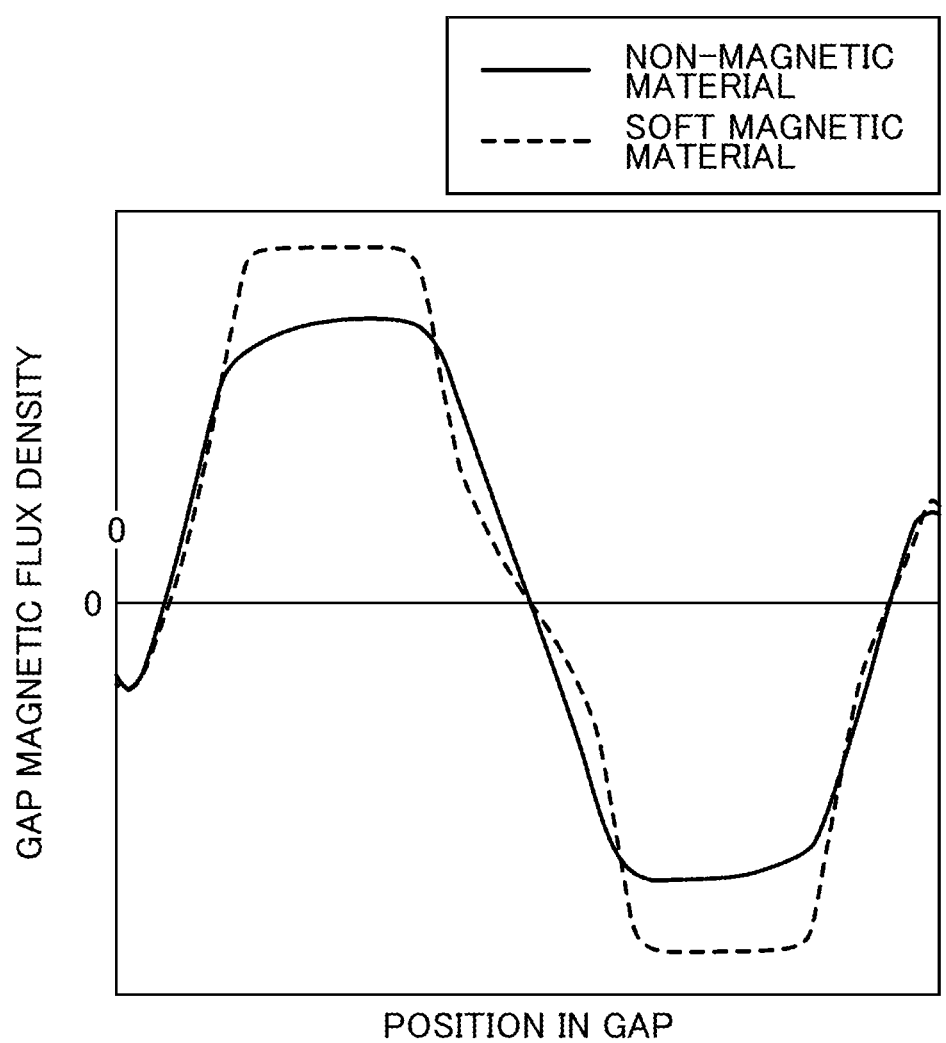
FIG. 16 is a graph illustrating a fourth example of the magnetic flux density generated in the gap.

FIG. 15 is a drawing illustrating a fourth example of the field magnet 10 according to the present embodiment. FIG. 16 is a graph illustrating a fourth example of the gap magnetic flux density between the field magnet 10 and the armatures 20A and 20B. Specifically, FIG. 16 is a graph illustrating a comparison between the gap magnetic flux density in a case where the holding section 13 is made of a non-magnetic material and the gap magnetic flux density in a case where the holding section 13 is made of a soft magnetic material with respect to the field magnet 10 according to the present example. FIG. 17 is a drawing illustrating an example of a method of assembling the field magnet 10 according to the present example. In FIG. 17, the order of inserting multiple magnet members corresponding to the main magnet 11, the auxiliary magnet 12A, and the auxiliary magnet 12B into the magnet holes of the holding section 13 is described in numerals with parentheses.

As illustrated in FIG. 15, in the present example, as in the above-described second example, the field magnet 10 includes the main magnet 11 configured as a single magnet member and the auxiliary magnets 12A and 12B, respectively corresponding to the field magnet sections 10A and 10B, configured as separate magnet members. In the present example, as in the above-described third example, the holding section 13 is included.

In the present example, the field magnet 10 is configured such that the main magnet 11 and the auxiliary magnet 12 (i.e., a combination of auxiliary magnets 12A and 12B) are alternately arranged in the X-axis direction, and includes two main magnets 11 and three auxiliary magnets 12.

As illustrated in FIG. 15, in the holding section 13, magnet holes, through which multiple magnet members (in the present example, eight magnet members) respectively corresponding to the main magnet 11, the auxiliary magnet 12A, and the auxiliary magnet 12B are embedded, are provided. The holding section 13 has a substantially rectangular shape in which the length in the X-axis direction is longer than the length in the Z-axis direction, when viewed in the Y-axis direction, and has the magnet holes through which the magnet members corresponding to the main magnet 11, the auxiliary magnet 12A, and the auxiliary magnet 12B can be inserted in the Y-axis direction. Specifically, in the holding section 13, one magnet hole, corresponding to the main magnet 11, provided in a relatively wide area at substantially the center of the holding section 13 in the Z-axis direction and two magnet holes, respectively corresponding to the auxiliary magnets 12A and 12B, arranged in the Z-axis direction, are alternately arranged in the X-axis direction. This enables the holding section 13 to hold the main magnet 11, the auxiliary magnet 12A, and the auxiliary magnet 12B that are embedded. Thus, for example, as in the above-described third example, a situation in which the magnet members corresponding to the main magnet 11A, the auxiliary magnet 12A, and the auxiliary magnet 12B are separated from the field magnet 10, due to an impact or the like acting on the field magnet 10, can be prevented. When the field magnet 10 is manufactured, an operator can manufacture the field magnet 10 by inserting the corresponding magnet members into the magnet holes provided in the holding section 13, as in the above-described third example. Therefore, the assembly of the field magnet 10 can be facilitated.

The holding section 13 may, for example, be made of a non-magnetic material, as in the above-described third example. This further facilitates the assembly of the field magnet 10.

The holding section 13 may, for example, be made of a soft magnetic material, as in the above-described third example. This can relatively increase the gap magnetic flux density of the field magnet 10, as illustrated in FIG. 16. Therefore, the thrust of the linear motor 1 can be further increased while the assembly of the field magnet 10 is facilitated.

In the present example, as illustrated in FIG. 17, the auxiliary magnet 12A, the auxiliary magnet 12B, and the auxiliary magnet 12A are inserted into the holding section 13 (i.e., the magnet holes) from the left in the order of (1) to (3), and then the main magnets 11 are inserted into the holding section 13 (i.e., the magnet holes) in the order of (4) and (5). Finally, the auxiliary magnet 12B, the auxiliary magnet 12A, and the auxiliary magnet 12B are inserted into the holding section 13 (i.e., the magnet holes) from the left in the order of (6) to (8). This can reduce the force, acting from other magnet members when the auxiliary magnets 12A and 12B are inserted into the holding section 13 (i.e., the magnet holes) in the order of (6) to (8), that is caused by the magnetic interaction between the auxiliary magnets 12A and 12B and the main magnet 11 inserted in the steps of (1) to (5). Therefore, when the field magnet 10 is manufactured, an operator can easily insert the auxiliary magnets 12A and 12B into the holding section 13 (i.e., the magnet holes), thereby facilitating the assembly of the field magnet 10.

As described, some of the magnet members corresponding to the auxiliary magnet 12 separated into two magnet members are first inserted into the holding section 13, and then the main magnets 11 are inserted into the holding section 13. This can reduce the magnetic force acting from other magnet members already inserted, when the magnet members corresponding to the remaining auxiliary magnet 12 are inserted into the holding section 13 (i.e., the magnet holes). Therefore, the assembly of the field magnet 10 can be facilitated.

[Action]

Next, the action of the linear motor 1 (i.e., the field magnet 10) according to the present embodiment will be summarized.

In the present embodiment, the field magnet 10 includes the field magnet section 10A, disposed between the armature 20A and 20B that are parallel to each other, facing the armature 20A among the armature 20A and 20B, and the field magnet section 10B facing the armature 20B that is different from the armature 20A among the armature 20A and 20B. Additionally, the field magnet section 10A includes the main magnet 11A that generates a magnetic field for the armature 20A and an auxiliary magnet 12A that increases the magnetic flux of the magnetic pole, facing the armature 20A, of the main magnet 11A. Additionally, the field magnet section 10B includes the main magnet 11B that generates a magnetic field for the armature 20B and the auxiliary magnet 12B that increases the magnetic flux of the magnetic pole, facing the armature 20B, of the main magnet 11B. The main magnet 11A and the main magnet 11B, or the auxiliary magnet 12A and the auxiliary magnet 12B are configured as permanent magnets having the same magnetization direction.

Then, in the field magnet 10, the main magnet 11A and the auxiliary magnet 12A, and the main magnet 11B and the auxiliary magnet 12B form a Halbach array, so that the magnetic flux to the armatures 20A and 20B can be relatively increased. Therefore, the thrust of the linear motor 1 can be increased.

The main magnets 11A and 11B having the same magnetization direction are configured as the main magnet 11 serving an integral permanent magnet and can be aggregated into a single component. Similarly, the auxiliary magnets 12A, 12B having the same magnetization direction can be aggregated into the auxiliary magnet 12 as an integral permanent magnet. Therefore, the number of the components of the magnet member forming a Halbach array is reduced, and the assembly of the field magnet 10 can be facilitated.

Therefore, in the present embodiment, the field magnet 10 can increase the thrust of the linear motor 1 while facilitating the assembly.

Additionally, in the present embodiment, the main magnet 11A and the auxiliary magnet 12A, and the main magnet 11B and the auxiliary magnet 12B may be disposed along a direction parallel to the armature 20A and 20B such that the main magnet 11A and the main magnet 11B are aligned, and the auxiliary magnet 12A and the auxiliary magnet 12B are aligned. The main magnet 11A and the main magnet 11B, or the auxiliary magnet 12A and the auxiliary magnet 12B, that are disposed at the same position in the direction parallel to the armature 20A and 20B, may be configured as a single magnet member.

Thus, specifically, in the field magnet 10, one combination of magnets that has the same magnetization direction among the main magnets 11A and 11B, or the auxiliary magnets 12A and 12B at the same positions in the direction parallel to the armatures 20A and 20B can be configured as a single magnet member. Therefore, specifically, the number of the components of the magnet member forming a Halbach array can be relatively reduced.

In the present embodiment, the main magnet 11A and the main magnet 11B may be magnetized in directions facing the armature 20A and 20B and in directions opposite to each other. The auxiliary magnet 12A and the auxiliary magnet 12B may be magnetized in a direction parallel to the armatures 20A and 20B and in the same direction.

With the above arrangement, the field magnet 10 can be formed as a Halbach array in which the auxiliary magnets 12A and 12B are configured as a single magnet member (i.e., the auxiliary magnet 12) by aligning the magnetization directions of the auxiliary magnets 12A and 12B in the same direction. Therefore, specifically, the field magnet 10 can increase the thrust of the linear motor 1 while facilitating the assembly of the field magnetic field.

In the present embodiment, the auxiliary magnet 12A and the auxiliary magnet 12B may be magnetized in the direction parallel to the armatures 20A and 20B and in the directions opposite to each other. The main magnet 11A and the main magnet 11B may be magnetized in the directions facing the armatures 20A and 20B and in the same direction.

With the above arrangement, the field magnets 10 can achieve a Halbach array in which the main magnets 11A and 11B are configured as a single magnet member (i.e., the main magnet 11) by aligning the magnetization directions of the main magnets 11A and 11B. Therefore, specifically, the field magnet 10 can increase the thrust of the linear motor 1 while facilitating the assembly.

Additionally, in the present embodiment, the field magnet 10 may include the holding section 13, having holes (i.e., the magnet holes), that holds multiple magnet members corresponding to the main magnet 11A, the main magnet 11B, the auxiliary magnet 12A, and the auxiliary magnet 12B.

This can facilitate the assembly of the field magnet 10, for example, in comparison with a case where the magnet members are bonded to each other with adhesive or the like. Additionally, in the field magnet 10, the separation of the magnet member can be prevented in comparison with a case where the magnet members are bonded to each other with adhesive or the like.

In the present embodiment, the holding section 13 may be made of a soft magnetic material.

This can relatively reduce the magnetic reluctance between the magnet members in the field magnet 10. Therefore, in the field magnet 10, the main magnets 11A and 11B can generate a relatively high magnetic flux density to the armatures 20A and 20B.

In the present embodiment, the holding section 13 may be made of a non-magnetic material.

This can prevent the magnetic attraction force from being generated between the magnet members and the holding section 13 in the field magnet 10. Therefore, the assembly of the field magnet 10 can further be facilitated.

In the present embodiment, an operator may first insert some of first magnet members into corresponding holes among the magnet holes of the holding section 13. Then, the operator may insert second magnet members into corresponding holes among the magnet holes of the holding section 13. The first magnet members are either main magnet members corresponding to the first main magnet and the second main magnet or auxiliary magnet members corresponding to the first auxiliary magnet and the second auxiliary magnet included in the multiple magnet members, the second magnet members are either the main magnet members or the auxiliary magnet members, and the number of the first magnet members is greater than the number of the second magnet members.

The first magnet member (hereinafter, a "non-common magnet member") corresponds to a member, among the main magnet 11 and the auxiliary magnet 12, that is separated into two magnet members respectively corresponding to the field magnet sections 10A and 10B. Further, the second magnet member (hereinafter, a "common magnet member") corresponds to a member, among the main magnet 11 and the auxiliary magnet 12, that is integrated as a single magnet member because the field magnet sections 10A and 10B are magnetized in the same direction.

For example, in steps in which all the first magnet members (i.e., the non-common magnet members), having a greater number of components, that are not integrated as single magnet members in the field magnet sections 10A and 10B among the main magnet 11 and the auxiliary magnet 12, are first inserted into the holes, the workability may be deteriorated due to the force acting between the non-common magnet members.

With respect to the above, in the present embodiment, in the process of manufacturing the field magnet 10, a state, in which some of the non-common magnet members having a larger number of components among the main magnets 11 and the auxiliary magnets 12 and the common magnet members having a small number of components are first inserted into the corresponding magnet holes of the holding section 13, can be achieved. Thus, when the remaining non-common magnet members are inserted into the corresponding magnet holes of the holding section 13, the magnetic action between the non-common magnet members and the common magnet members already inserted into the holding section 13 (e.g., the action of a Halbach array) can reduce the force acting on the remaining non-common magnet member. Therefore, an operator can more easily manufacture the field magnet 10.

In the present embodiment, an operator may insert only one of the two magnet members, included in the non-common magnet member, disposed at the same position in the direction parallel to the armatures 20A and 20B into the corresponding magnet hole of the holding section 13, and then insert the common magnet member into the magnet hole of the holding section 13. The operator may then insert the remaining non-common magnet members into the corresponding magnet holes of the holding section 13.

This enables the operator to specifically manufacture the field magnet 10 more easily.

[Modification and Alteration]

Although the embodiment has been described in detail above, the disclosure is not limited to the particulars of the described embodiment, and various modifications and alterations can be made within the scope of the claimed subject matter.

For example, in the embodiment described above, the mover of the linear motor 1 may be configured to move along a curve rather than along a line corresponding to the X-axis direction. In this case, for example, the armatures 20A and 20B arranged such that the field magnet 10 is interposed may have substantially parallel curved shapes when viewed in the Y-axis direction. In this case, "parallel" indicates a state in which two lines (including curves) do not intersect with maintaining an equal space.

What is claimed is:

1. A permanent field magnet disposed between two armatures parallel to each other, the permanent field magnet comprising:
 a first field magnet section facing a first armature of the two armatures; and
 a second field magnet section facing a second armature of the two armatures, the second armature being different from the first armature,
 wherein the first field magnet section includes a first main magnet that generates a magnetic field for the first armature and a first auxiliary magnet that increases magnetic flux of a magnetic pole of the first main magnet, the magnetic pole of the first main magnet facing the first armature,
 wherein the second field magnet section includes a second main magnet that generates a magnetic field for the second armature and a second auxiliary magnet that increases magnetic flux of a magnetic pole of the second main magnet, the magnetic pole of the second main magnet facing the second armature, and
 wherein the first main magnet, the second main magnet, the first auxiliary magnet, and the second auxiliary magnet are permanent magnets magnetized in a same direction and permanent magnets magnetized in different directions, the permanent magnets magnetized in the same direction being the first main magnet and the second main magnet, or the first auxiliary magnet and the second auxiliary magnet, the permanent magnets magnetized in the same direction being formed from a monolithic structure, and the permanent magnets magnetized in the different directions being separate magnet members.

2. The permanent field magnet as claimed in claim 1, wherein the first main magnet and the first auxiliary magnet, and the second main magnet and the second auxiliary magnet are arranged along a direction parallel to the two armatures such that the first main magnet and the second main magnet are aligned and the first auxiliary magnet and the second auxiliary magnet are aligned.

3. The permanent field magnet as claimed in claim 2, wherein the first main magnet and the second main magnet are magnetized in directions facing the two armatures and in directions opposite to each other, and
wherein the first auxiliary magnet is magnetized in the same direction as the second auxiliary magnet, and the first auxiliary magnet and the second auxiliary magnet are magnetized in the direction parallel to the two armatures.

4. The permanent field magnet as claimed in claim 2, wherein the first main magnet is magnetized in the same direction as the second main magnet, and the first main magnet and the second main magnet are magnetized in a direction facing the two armatures, and
wherein the first auxiliary magnet and the second auxiliary magnet are magnetized in directions parallel to the two armatures and in directions opposite to each other.

5. The permanent field magnet as claimed in claim 1, further comprising a holding section including holes that hold a plurality of magnet members corresponding to the first main magnet, the second main magnet, the first auxiliary magnet, and the second auxiliary magnet.

6. The permanent field magnet as claimed in claim 5, wherein the holding section is made of a soft magnetic material.

7. The permanent field magnet as claimed in claim 5, wherein the holding section is made of a non-magnetic material.

8. A method of manufacturing the permanent field magnet as claimed in claim 5, the method comprising inserting some of first magnet members into corresponding holes among the holes, and then inserting second magnet members into corresponding holes among the holes, the first magnet members being either main magnet members corresponding to the first main magnet and the second main magnet or auxiliary magnet members corresponding to the first auxiliary magnet and the second auxiliary magnet included in the plurality of magnet members, the second magnet members being either the main magnet members or the auxiliary magnet members, and a number of the first magnet members being greater than a number of the second magnet members.

9. The method as claimed in claim 8, wherein the inserting of the some of the first magnet members includes inserting one of two magnet members, disposed at a same position in a direction parallel to the two armatures, included in the first magnet members, and the method further comprises inserting remaining first magnet members into corresponding holes among the holes after the second magnet members have been inserted.

10. A linear motor comprising the permanent field magnet as claimed in claim 1.

11. The permanent field magnet as claimed in claim 1, further comprising a holding section including holes that respectively hold the magnet member formed from the monolithic structure and the separate magnet members.

\* \* \* \* \*